Patented May 1, 1934

1,957,130

UNITED STATES PATENT OFFICE 1,957,130

METHOD OF ABSORBING NITROGEN OXIDE GASES MIXED WITH OXYGEN OR AIR

Friedrich Bartling, Huglfing, and August Meier, Munich, Germany; Jenny Bartling, legal representative of said Friedrich Bartling, deceased, assignors to Alterum Kredit-Aktien-Gesellschaft, Berlin, Germany, a company of Germany No Drawing. Application December 7, 1931, Serial No. 579,644. In Germany January 16, 1931

2 Claims. (Cl. 23—2)

This invention relates to the absorption of nitrogen oxide gases, and has for its object to provide an improved method of carrying out such absorption.

In most of the known methods of absorbing nitrogen oxide gases water is used as the absorption liquid, or in particular cases solutions of alkali hydrate or the like. Various attempts have also been made to carry out the absorption by means of common salt.

The object of the present invention is to provide a process for absorbing nitrogen oxide gases mixed with oxygen or air and is characterized by the employment of ammonium bicarbonate as the absorbent. As is known, the admixture of oxygen or air is necessary in order to permit the oxidation of a lower nitrogen oxide to a higher nitrogen oxide.

It has been found by experiment that ammonium bicarbonate has to a very large degree the ability to absorb nitrogen oxide gases, ammonium nitrate being yielded as the absorption product. The absorption takes place in such short time and so completely that only a very small use of apparatus is necessary as compared with the apparatus customary hitherto.

A particularly good absorption is effected if the gases which are to be absorbed and thereby converted are made to act on solid ammonium bicarbonate, preferably in coarse crystalline form. The advantage of using solid ammonium bicarbonate is due mainly to the fact that in this form the absorbing or reacting agent exists in its highest concentration while, as is known, solutions of ammonium bicarbonate have relatively weak concentration. When a very coarse crystalline form of the salt is used, it is simple to pass the gases which are to be converted through the heaped up salt.

A particularly advantageous method of carrying out the process consists in allowing the gases to permeate from below through solid ammonium bicarbonate contained in suitable vessels, preferably in a coarse crystalline form. The conversion into ammonium nitrate liberates a certain quantity of water by which the ammonium nitrate formed is substantially washed away downwards. Thus a highly concentrated solution of ammonium nitrate collects at the bottom of the receptacle, containing also in solution certain amounts of ammonium bicarbonate and ammonia.

In permeating through the heaped-up mass of salt, a practically complete absorption of the nitrogen oxide gases takes place, so that practically only carbonic acid appears in the upper part of the container, together with any excess oxygen and, if air was admixed with the nitrogen oxide gases, nitrogen. In the passage through the salt itself, the ammonia vapour which escapes continually from the ammonium bicarbonate, permits a particularly intensive absorption of the nitrogen oxide gases. In certain cases it may be of advantage to facilitate this formation of ammonia vapour by gently heating, since naturally the absorption of the nitrogen oxide gases is rendered particularly intensive by the vaporous ammonia. In any case the experiments which have been made showed that nitrogen oxide gases to which oxygen was added, were completely absorbed, so that only carbonic acid and some excess oxygen remained as the gaseous final products.

A continuation of the invention consists in subjecting the solution, formed by absorption by means of solid ammonium bicarbonate, to the action of fresh nitrogen oxide gases. In this way the final traces of dissolved ammonia and ammonium bicarbonate can be converted to ammonium nitrate. After acting on the solution, these gases can then be passed through the heaped up mass to react with the solid ammonium bicarbonate.

An advantageous method of carrying out the invention consists in utilizing the carbonic acid which escapes for precipitating fresh ammonium bicarbonate. For this purpose the carbonic acid is introduced into an ammoniacal solution, whereby solid ammonium bicarbonate is immediately formed and precipitated in known manner.

The ammonium nitrate obtained can be sold as such or used to form a variety of saleable products by being subjected wholly or partially to a known reaction with alkali chloride to form ammonium chloride and alkali nitrate. As is known, the two latter salts are precipitated in solid form in a single operation, so that they can either be sold as a mixture or separately after having been previously separated.

The advantage of the absorption according to the invention, besides the simplicity with which this hitherto very complicated process may be carried out, consists in the fact that ammonium nitrate, i. e. finished product ready for sale, is immediately obtained.

We claim:
1. The method of absorbing nitrogen oxide gases admixed with oxygen, which comprises passing the gases upwardly through coarse solid ammonium bicarbonate, and gently heating the ammonium bicarbonate.

2. The method of absorbing nitrogen oxide gases admixed with oxygen, which comprises passing the gases upwardly through coarse solid ammonium bicarbonate, and thereafter passing fresh nitrogen oxide gases through the liquid product of the absorption and then through the ammonium bicarbonate.

FRIEDRICH BARTLING.
AUGUST MEIER.